United States Patent
Vann (10) Patent No.: US 9,960,647 B2
(45) Date of Patent: May 1, 2018

(54) ENHANCED FLUX-DENSITY MAGNET

(71) Applicant: Charles Stuart Vann, El Granada, CA (US)

(72) Inventor: Charles Stuart Vann, El Granada, CA (US)

(73) Assignee: Vanntec LLC, El Granada, CA (US)

( * ) Notice: Subject to any disclaimer, the term of this patent is extended or adjusted under 35 U.S.C. 154(b) by 298 days.

(21) Appl. No.: 14/872,423

(22) Filed: Oct. 1, 2015

(65) Prior Publication Data

US 2017/0098972 A1   Apr. 6, 2017

(51) Int. Cl.
| | |
|---|---|
| H02K 21/12 | (2006.01) |
| H02K 1/27 | (2006.01) |
| H01F 7/02 | (2006.01) |
| H02K 1/02 | (2006.01) |

(52) U.S. Cl.
CPC ........... H02K 1/2773 (2013.01); H01F 7/021 (2013.01); H01F 7/0273 (2013.01); H02K 1/02 (2013.01)

(58) Field of Classification Search
CPC .................................. H02K 1/27; H01F 41/02
USPC ....... 310/12.25, 12.26, 49.14, 49.32, 156.43, 310/156.44, 156.49, 156.52, 156.54, 310/156.55, 156.57, 171, 172, 181, 186, 310/190
See application file for complete search history.

(56) References Cited

U.S. PATENT DOCUMENTS

| | | | |
|---|---|---|---|
| 5,705,902 A | 1/1998 | Merritt | |
| 7,994,674 B2 | 8/2011 | McClellan | |
| 8,299,672 B2 | 10/2012 | McClellan | |
| 8,514,047 B2 | 8/2013 | Sankar | |
| 2009/0295380 A1* | 12/2009 | Motz | G01R 33/072 324/251 |
| 2010/0219712 A1* | 9/2010 | Kogure | H02K 1/2766 310/156.43 |
| 2012/0217834 A1* | 8/2012 | Lutz | H02K 1/2753 310/156.39 |
| 2012/0262019 A1* | 10/2012 | Smith | H02K 1/2766 310/156.07 |
| 2013/0328453 A1* | 12/2013 | Duncan | H02K 1/2786 310/67 R |

* cited by examiner

Primary Examiner — Jose Gonzalez Quinone (57) ABSTRACT

One embodiment of an enhanced flux-density magnet comprises a magnetic material with two magnetic poles and one magnetic pole-area smaller than the other magnetic pole-area. Because the magnetic field at both pole-areas is equal but the magnetic pole-areas are unequal, the magnetic flux-density is proportionally greater at the magnetic pole with a smaller area than the magnetic pole with the larger area and greater than if the magnetic pole-areas were equal.

15 Claims, 8 Drawing Sheets

ENHANCED FLUX-DENSITY MAGNET

CROSS-REFERENCE TO RELATED APPLICATIONS

This application benefits from U.S. Pat. No. 8,487,486, filed 2013 Jul. 16 by the present inventor.

FEDERAL SPONSORED RESEARCH

Not applicable

SEQUENCE LISTING OF PROGRAM

Not applicable

BACKGROUND

Prior Art

US Patents

| Patent Number | Kind Code | Issue Date | Patentee |
| --- | --- | --- | --- |
| 8,514,047 | B2 | 2013 Aug. 20 | Sankar |
| 8,299,672 | B2 | 2012 Oct. 30 | McClellan |
| 7,994,674 | B2 | 2008 Jan. 25 | McClellan |
| 5,705,902 | | 1998 Jan. 6 | Merritt |

Electric motors and electric generators use magnets to either convert electricity into mechanical motion (motor) or mechanical motion into electricity (generator). The magnets in these devices can be permanent or electromagnetic and have a north-pole and a south-pole of equal area. Their magnetic field is invisible but is known to induce an electromotive force (EMF) in a wire coil when either the magnetic field of the magnet moves perpendicular (normal) to a stationary wire coil or the wire coil moves normal to the magnetic field of a stationary magnet. This EMF produces electrical power in a generator. Furthermore, an electric current in a wire coil creates a magnetic field that repels or attracts a magnet. This also is an EMF and produces the mechanical power to drive a motor.

Thus, motors and generators consist of two essential components: magnets to produce a magnetic field and wire coils to convert the magnetic field into mechanical power (motor) or electrical power (generator), and these two components contribute much of the cost, weight, and volume of a device. Therefore, reducing the amount of either or both components without reducing power can substantially lower cost, weight, and volume of a device. Furthermore, reducing wire decreases the electrical resistance of the device which increases operating efficiency. Studying the prior art reveals many attempts at reducing these components but without significant success.

SUMMARY

In accordance with the embodiments, an Enhanced Flux-Density Magnet (EFDM) comprises a magnetic material where the magnetic pole-areas of one magnetic polarity are smaller than the magnetic pole-areas of the other magnetic polarity. In proportion to the inequality of the magnetic pole-areas, the magnetic flux-density is greater at the smaller magnetic pole-areas than the larger magnetic pole-areas and greater than if the magnetic pole-areas were equal.

Advantages

Accordingly the greater magnetic flux-density of the EFDM enables less coil wire without reducing power from an electrical motor or generator. Less wire reduces cost, weight, and volume of the device. Furthermore, reducing wire decreases the electrical resistance of the device which increases operating efficiency. Also, the EFDM eliminates the need for magnetic iron without reducing power in electrical motors and generators. Eliminating magnetic iron reduces weight, cost, and volume of the device while removing power losses such as core saturation, eddy currents, and cogging.

DRAWINGS—REFERENCE NUMERALS 10 first-embodiment EFDM
12 magnetic material
14 magnetic field
16 north magnetic pole-areas where the magnetic field exits the magnetic material
18 south magnetic pole-areas where the magnetic field enters the magnetic material
19 contiguous surface between two EFDMs
20 second-embodiment EFDM
30 third-embodiment EFDM
32 electric current
34 electric wire
40 fourth-embodiment EFDM
50 electromagnet for magnetizing EFDM
60 motor or generator with 8 first-embodiment EFDMs 10 and 8 second-embodiment EFDMs 20
62 hub
64 wire coil
70 motor or generator with 4 first-embodiment EFDMs 10 and 4 second-embodiment EFDMs 20
80 motor or generator with 4 first-embodiment EFDMs 10 and 4 second-embodiment EFDMs 20 separated by magnetic iron spacers 82
82 magnetic iron spacers
90 motor or generator with 4 first-embodiment EFDMs 10 contiguous with 4 second-embodiment EFDMs 20

DETAILED DESCRIPTION

The amount of EMF induced by the relative motion of the magnet and wire is determined by Faraday's law of induction which is as follows.

$$E = -N d\Phi_B/dt$$

Where, E is the EMF (measured in volts) and $\Phi_B$ is the magnetic flux through a single loop, N is the number of turns, and t is time. In more advanced physics, the magnetic flux is properly defined as the surface integral of the normal component of the magnetic field passing through a surface, i.e.

$$\Phi_B = B*S = BS\cos\theta$$

where B is the magnitude of the magnetic field (the magnetic flux-density), S is the area of the surface, and $\theta$ is the angle between the magnetic field lines and the normal (perpendicular) to area S.

Thus, the introduction of more powerful magnets such as rare earth permanent magnets increases magnetic flux-density, but further increases of this type are not expected. More wire turns also produces higher EMF, but adds cost, weight, and volume with diminishing benefit as more turns are added. Furthermore, adding more wire increases the electrical resistance of the device which lowers the operating efficiency and increases device heat that limits output power.

To maintain a near normal angle between the magnetic field and the wire coils, motors and generators often use magnetic iron to guide the flux throughout the motor or generator. However, magnetic iron adds cost, weight, volume, and complexity while adding power losses such as core saturation, eddy currents, and cogging.

Sankar in U.S. Pat. No. 8,514,047 and Merritt in U.S. Pat. No. 5,705,902 discuss using Halbach arrays of magnets in electric machines to increase magnetic flux-density. The Halbach array consists of multiple magnets arranged perpendicular to each other such that the magnetic field exits mostly on only one side of the array. While this arrangement is useful for refrigerator magnets and magnetically levitated locomotives, it is not particularly useful in electric devices. This is because it does not channel or transfer magnetic flux-density any better than arrangements of magnetic iron while adding complexity and magnetic field losses.

Flux focusing shaped permanent magnets as discussed by McClellan in U.S. Pat. Nos. 8,299,672 and 7,994,674 also redirect the flux to a preferred side of the magnet but do not increase the magnetic flux-density at the magnetic poles where it would be useful by increasing EMF in a motor or generator.

Thus, prior art attempts to significantly reduce the cost, weight, and volume of magnets or wire in motors and generators have failed, and motor and generator design has remained essentially the same for over 100 years.

In contrast to prior art, the EFDM has greater magnetic flux-density that enables less coil wire without reducing power from an electrical motor or generator. Less wire reduces cost, weight, and volume of the device. Furthermore, reducing wire decreases the electrical resistance of the device which increases operating efficiency.

First-Embodiment—FIGS. 1 through 6

Figure 1:
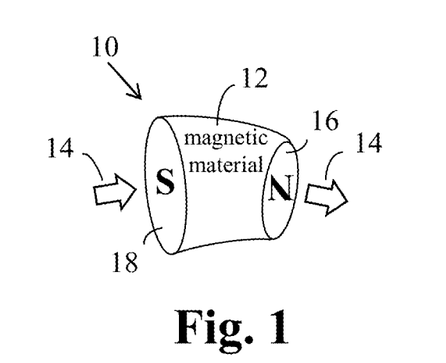
FIG. 1 shows an isometric view of a first-embodiment EFDM 10 where north magnetic pole-area 16 is smaller than south magnetic pole-area 18.
Figure 2:
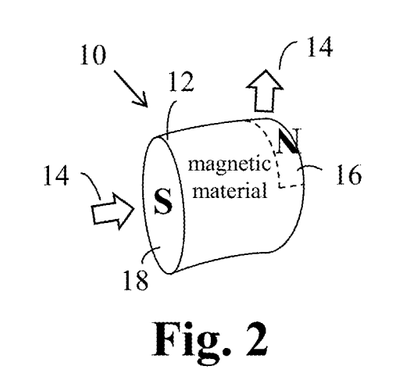
FIG. 2 shows an isometric view of first-embodiment EFDM 10 where north magnetic pole-area 16 is smaller than and substantially perpendicular to south magnetic pole-area 18.
Figure 3:
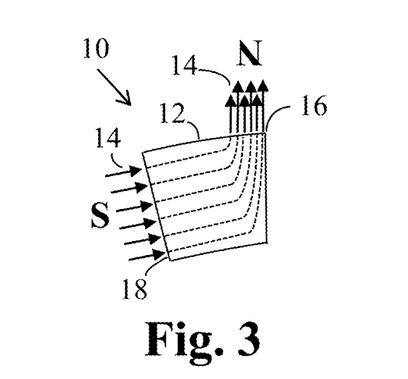
FIG. 3 shows a cross-section view of a first-embodiment EFDM 10 with magnetic field 14 passing through the larger south magnetic pole-area 18 and bending to the smaller north magnetic pole-area 16.
Figure 4:
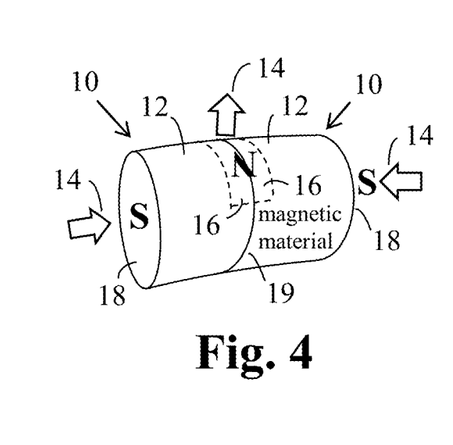
FIG. 4 shows an isometric view of two, first-embodiment EFDMs 10 with their smaller north magnetic pole-areas 16 substantially touching and their larger south magnetic pole-areas 18 at opposite ends of magnetic material 12.
Figure 5:
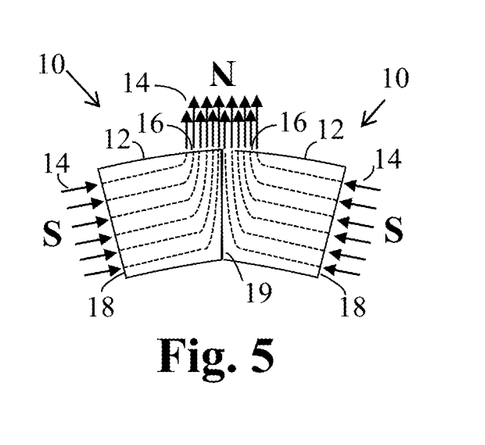
FIG. 5 shows a cross-section view of two, first-embodiment EFDMs 10 with magnetic field 14 passing through the larger south magnetic pole-areas 18 and bending to the smaller north magnetic pole-areas 16.

First-embodiment EFDM 10 is illustrated in FIGS. 1, 2, 4, 6 (isometric views) and FIGS. 3, 5 (side views). EFDM 10 consists of magnetic material 12 that has been magnetized to create its own persistent, magnetic field 14, such that magnetic material 12 is a permanent magnet. Some examples of magnetic materials 12 are ceramic, iron, nickel, cobalt, some alloys of rare-earth metals, and some naturally occurring minerals such as lodestone. Magnet material 12 has one or more north magnetic pole-areas 16 where magnetic field 14 leaves magnetic material 12 and one or more south magnetic pole-areas 18 where magnetic field 14 enters magnetic material 12.

Because magnetic field 14 is created from dipole microstructures in magnetic material 12, the magnitude of magnetic field 14 exiting north magnetic pole-areas 16 is the same magnitude of magnetic field 14 entering south magnetic pole-areas 18. Magnetic flux-density is defined as the magnitude of magnetic field 14 through a finite area. Therefore, when the sum of one or more magnetic pole-areas of one polarity is smaller than the sum of one or more magnetic pole areas of the other polarity, the magnetic flux-density is proportionally greater at the smaller magnetic pole-areas since magnetic field 14 is the same at both magnetic pole-areas. In this embodiment, the sum of one or more north magnetic pole-areas 16 is smaller than the sum of one or more south magnetic pole-areas 18.

In FIG. 1, north magnetic pole-area 16 is smaller than south magnetic pole-area 18. Therefore, the magnetic flux-density at north magnetic pole-area 16 is greater than the magnetic flux-density at south magnetic pole-area 18. Furthermore, the magnetic flux-density at north magnetic pole-area 16 is greater that if north magnetic pole-area 16 and south magnetic pole-area 18 were equal.

The path of magnetic field 14 at the magnetic pole-areas and within the magnet is determined when magnet material 12 is magnetized. Therefore, by conservation of energy the following equations apply:

By definition: $MFD_n = MF_n/PA_n$ and therefore $MF_n = MFD_n*PA_n$ where $MFD_n$ is the magnetic flux-density at north magnetic pole-area 16; $MF_n$ is magnetic field 14 at north magnetic pole-area 16; and $PA_n$ is north magnetic pole-area 16.

By definition: $MFD_s = MF_s/PA_s$ and therefore $MF_s = MFD_s*PA_s$ where $MFD_s$ is the magnetic flux-density at south magnetic pole-area 18; $MF_s$ is magnetic field 14 at south magnetic pole-area 18; and $PA_s$ is south magnetic pole-area 18.

By definition: $MF_n = MF_s$ and therefore $MFD_n*PA_n = MFD_n*PA_s$

Thus: $MFD_n = MFD_s*(PA_s/PA_n)$ and $MFD_s = MFD_n*(PA_n/PA_s)$ Therefore, if one magnetic pole-area is smaller than the other magnetic pole-area than the flux-density at that smaller magnetic pole-area is proportionally greater than the magnetic flux-density at the larger magnetic pole-area. Furthermore, that flux-density is greater at the smaller magnetic pole-area than if the magnetic pole-areas were equal. These formulas apply for one or more magnetic pole-areas for each polarity. This surprising discovery of enhanced flux-density by unequal magnet pole-areas is a feature consistent through all embodiment of the EFDM.

Experiments were conducted to prove enhanced flux-density with a magnet having unequal magnetic pole-areas. One end of the magnet was much larger in area (about 1 square inch) than the other end (about 0.1 square inch). A gauss meter measured the magnetic flux-density at about 10 times greater at the smaller area end of the magnet than the larger area end, validating the mathematical formula above.

In FIG. 2, north magnetic pole-area 16 is smaller than south magnetic pole-area 18 and substantially perpendicular such that magnetic field 14 must bend inside magnetic material 12. Therefore, magnetic field 14 enters magnetic material 12 through the larger south magnetic pole-area 18 and exits through the smaller north magnetic pole-area 18. FIG. 3 is a side view showing magnetic field 14 bending inside magnetic material 12.

In FIG. 4, two first-embodiments EFDMs 10 are positioned such that their smaller north magnetic pole-areas 16 are substantially touching and larger south magnetic pole-areas 18 are at opposite ends of contiguous surface 19. FIG. 5 shows magnetic field 14 entering magnetic material 12 through the larger south magnetic pole-areas 18 approaching contiguous surface 19 and bending to exit the smaller north magnetic pole-areas 16.

Figure 6:
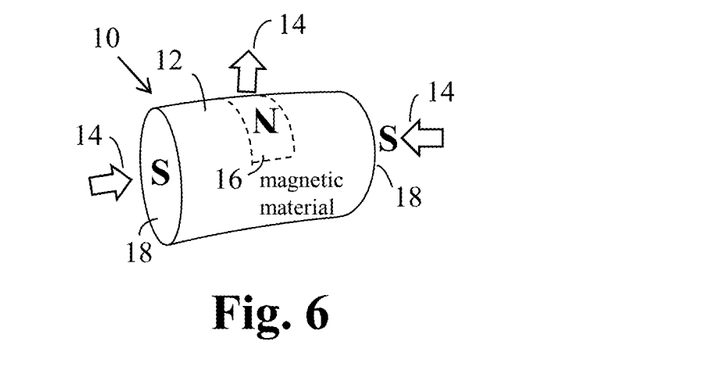
FIG. 6 shows an isometric view of a first-embodiment EFDM 10 with a north magnetic pole-area 16 in the center that is smaller than the sum of two south magnetic pole-areas 18 at opposite ends of magnetic material 12.

In FIG. 6, magnetic field 14 enters into magnetic material 12 passing through the larger south magnetic pole-areas 18 at opposite ends of magnetic material 12, and magnetic field 14 exits magnetic material 12 passing through the smaller north magnetic pole-area 16 at the center of magnetic material 12.

Second-Embodiment FIGS. 7 through 12

Figure 7:
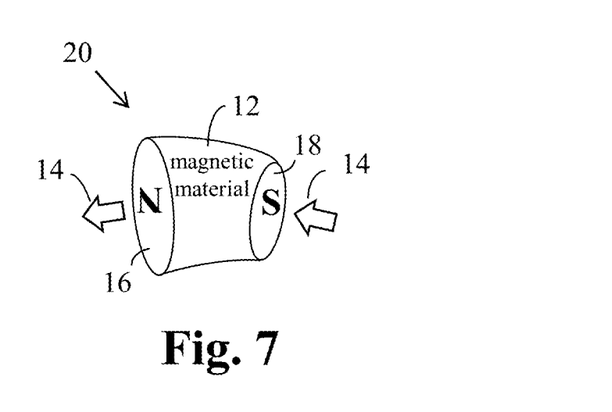
FIG. 7 shows an isometric view of a second-embodiment EFDM 20 where south magnetic pole-area 18 is smaller than north magnetic pole-area 16.
Figure 8:
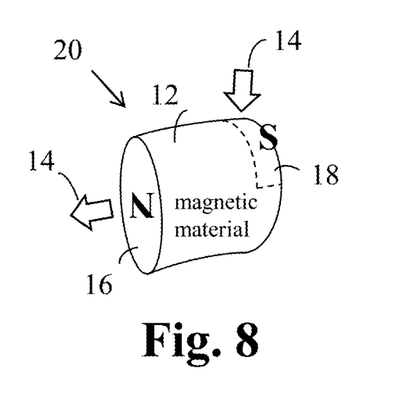
FIG. 8 shows an isometric view of second-embodiment EFDM 20 where south magnetic pole-area 18 is smaller than and substantially perpendicular to north magnetic pole-area
Figure 9:
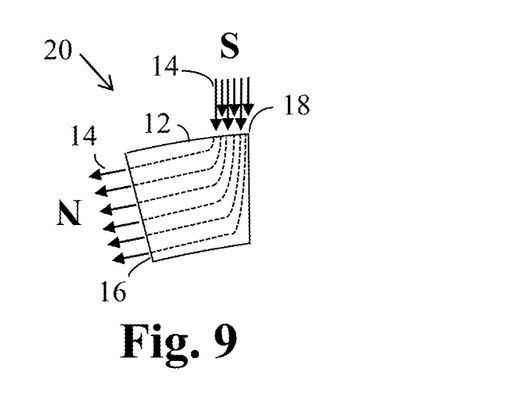
FIG. 9 shows a cross-section view of a second-embodiment EFDM 20 with magnetic field 14 passing through the smaller south magnetic pole-area 18 and bending to the larger north magnetic pole-area 16.
Figure 10:
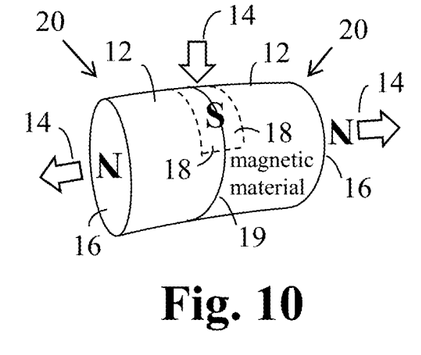
FIG. 10 shows an isometric view of two, second-embodiment EFDMs 20 with their smaller south magnetic pole-areas 18 substantially touching and their larger north magnetic pole-areas 16 at opposite ends of magnetic material 12.
Figure 11:
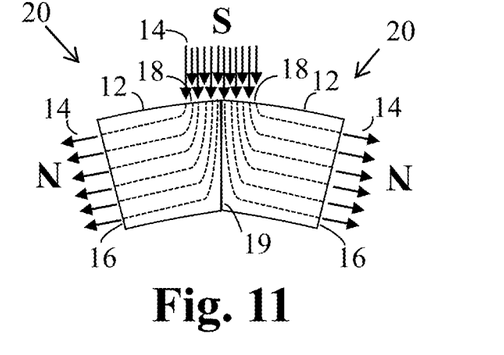
FIG. 11 shows a cross-section view of two, second-embodiment EFDMs 20 with magnetic field 14 passing through the smaller south magnetic pole-areas 18 and bending to the larger north magnetic pole-areas 16.

Second-embodiment EFDM 20 is illustrated in FIGS. 7, 8, 10, and 12 (isometric views) and FIGS. 9 and 11 (side views). EFDM 20 consists of magnetic material 12 that has been magnetized to create its own persistent, magnetic field 14, such that magnetic material 12 is a permanent magnet. Some examples of magnetic materials 12 are ceramic, iron, nickel, cobalt, some alloys of rare-earth metals, and some naturally occurring minerals such as lodestone. Magnet material 12 has one or more north magnetic pole-areas 16 where magnetic field 14 leaves magnetic material 12 and one or more south magnetic pole-areas 18 where magnetic field 14 enters magnetic material 12. In this embodiment, the sum of one or more south magnetic pole-areas 18 is smaller than the sum of one or more north magnetic pole-areas 16.

In FIG. 7, south magnetic pole-area 18 is smaller than north magnetic pole-area 16 such that the magnetic flux-density at south magnetic pole-area 18 is greater than the north magnetic pole-area 16. Furthermore, the magnetic flux-density at south magnetic pole-area 18 is greater that if south magnetic pole-area 18 and north magnetic pole-area 16 were equal.

In FIG. 8, south magnetic pole-area 18 is smaller than north magnetic pole-area 16 and substantially perpendicular such that magnetic field 14 must bend inside magnetic material 12. Therefore, magnetic field 14 enters magnetic material 12 through the smaller south magnetic pole-area 18 and exits through the larger north magnetic pole-area 16. FIG. 9 is a side view showing magnetic field 14 bending inside magnetic material 12.

In FIG. 10, two second-embodiments EFDMs 20 are positioned such that their smaller south magnetic pole-areas 18 are substantially touching and larger north magnetic pole-areas 16 are at opposite ends of contiguous surface 19. FIG. 11 shows magnetic field 14 entering magnetic material 12 through the smaller south magnetic pole-area 18 substantially parallel to contiguous surface 19 and bending to exit the larger north magnetic pole-areas 16.

Figure 12:
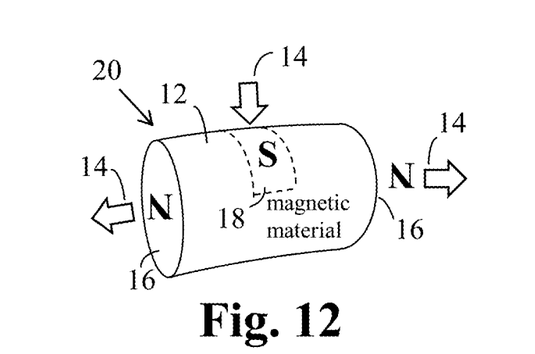
FIG. 12 shows an isometric view of a second-embodiment EFDM 20 with a south magnetic pole-area 18 in the center that is smaller than the sum of two north magnetic pole-areas 16 at opposite ends of magnetic material 12.

In FIG. 12, magnetic field 14 enters into magnetic material 12 passing through the smaller south magnetic pole-area 18 at the center of magnetic material 12, and magnetic field 14 exits magnetic material 12 passing through the two larger north magnetic pole-areas 16 at opposite ends of magnetic material 12.

Third-Embodiment FIGS. 13 through 16

Figure 13:
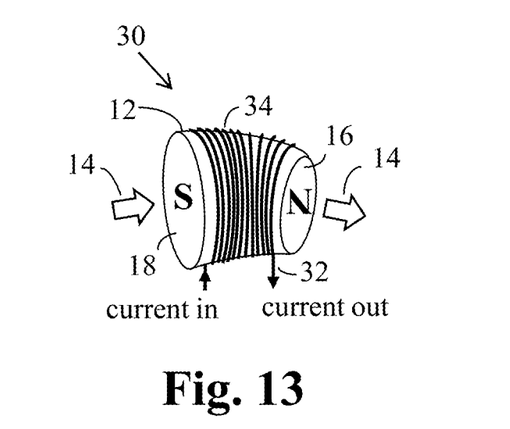
FIG. 13 shows an isometric view of a third-embodiment EFDM 30, an electromagnet where the north magnetic pole-area 16 is smaller than south magnetic pole-area 18.
Figure 14:
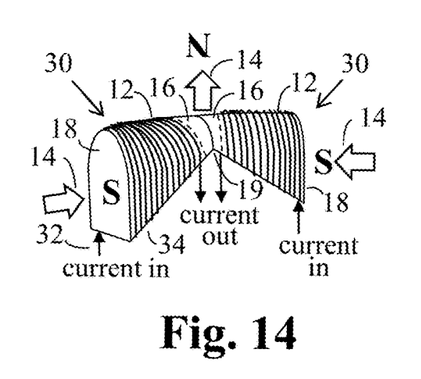
FIG. 14 shows an isometric view of two, third-embodiment EFDMs 30, electromagnets with their smaller north magnetic pole-areas 16 substantially touching and their larger south magnetic pole-areas 18 at opposite ends of magnetic material 12.
Figure 15:
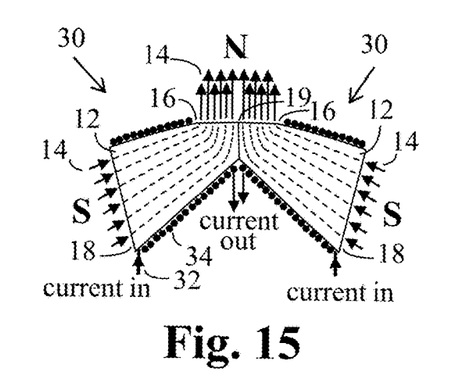
FIG. 15 shows a cross-section view of two, third-embodiment EFDMs 30, electromagnets with magnetic field 14 passing through the larger south magnetic pole-areas 18 and bending to the smaller north magnetic pole-area 16.
Figure 16:
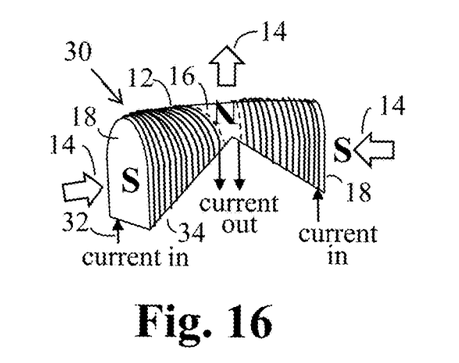
FIG. 16 shows an isometric view of a third-embodiment EFDM 30, an electromagnet with a north magnetic pole-area 16 in the center that is smaller than the sum of two south magnetic pole-areas 18 at opposite ends of magnetic material 12.

Third-embodiment EFDM 30 is illustrated in FIGS. 13, 14, and 16 (isometric views) and FIG. 15 (side view). Magnetic material 12 is magnetized only when electric current 32 is passed through electric wire 34 surrounding magnetic material 12, such that magnetic material 12 is an electromagnet. Some examples of magnetic materials 12 that work as electromagnets are iron, nickel, cobalt, some alloys of rare-earth metals, and lodestone. Magnet material 12 has one or more north magnetic pole-areas 16 where magnetic field 14 leaves magnetic material 12 and one or more south magnetic pole-areas 18 where magnetic field 14 enters magnetic material 12. According to the well-known right-had rule, the direction of current 32 in electric wire 34 determines which end of material 12 will be a north magnetic pole area 16 and which end will be a south magnetic pole area 18. In this embodiment, the sum of one or more north magnetic pole-areas 16 is smaller than the sum of one or more south magnetic pole-areas 18.

In FIG. 13, north magnetic pole-area 16 is smaller than south magnetic pole-area 18. Therefore, the magnetic flux-density at north magnetic pole-area 16 is greater than the magnetic flux-density at south magnetic pole-area 18. Furthermore, the magnetic flux-density at north magnetic pole-area 16 is greater that if north magnetic pole-area 16 and south magnetic pole-area 18 were equal.

In FIG. 14, two third-embodiments EFDMs 30 are positioned such that their smaller north magnetic pole-areas 16 are substantially touching and larger south magnetic pole-areas 18 are at opposite ends of contiguous surface 19. FIG. 15 shows magnetic field 14 entering magnetic material 12 through the larger south magnetic pole-areas 18 approaching contiguous surface 19 and bending to exit the smaller north magnetic pole-areas 16. Magnetic field 14 bends because it follows the path of microstructure alignment of magnetic material 12 when electric current 32 passes through electric wire 34. That path is determined by the arrangement of electric wire 34, and in this embodiment, electric wire 34 is arranged such that magnetic field 14 bends towards north magnetic pole areas 16.

In FIG. 16, magnetic field 14 enters into magnetic material 12 passing through the larger south magnetic pole-areas 18 at opposite ends of magnetic material 12, and magnetic field 14 exits magnetic material 12 passing through the smaller north magnetic pole-area 16 at the center of magnetic material 12.

Fourth-Embodiment FIGS. 17 through 20

Figure 17:
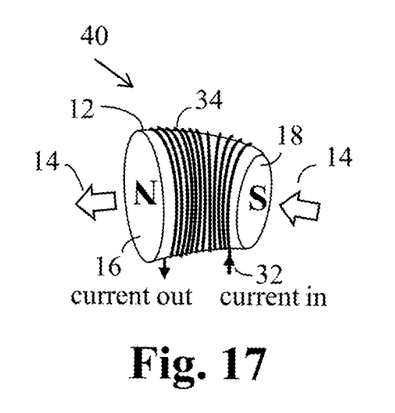
FIG. 17 shows an isometric view of a fourth-embodiment EFDM 40, an electromagnet where south magnetic pole-area 18 is smaller than north magnetic pole-area 16.
Figure 18:
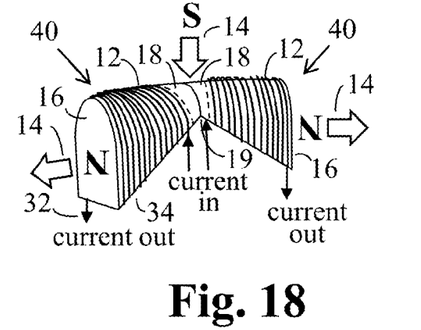
FIG. 18 shows an isometric view of two, fourth-embodiment EFDMs 40, electromagnets with their smaller south magnetic pole-areas 18 substantially touching and their larger north magnetic pole-areas 16 at opposite ends of magnetic material 12.
Figure 19:
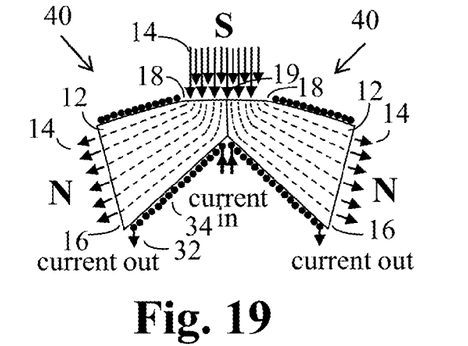
FIG. 19 shows a cross-section view of two, fourth-embodiment EFDMs 40, electromagnets with magnetic field 14 passing through the smaller south magnetic pole-area 18 and bending to the larger north magnetic pole-areas 16.
Figure 20:
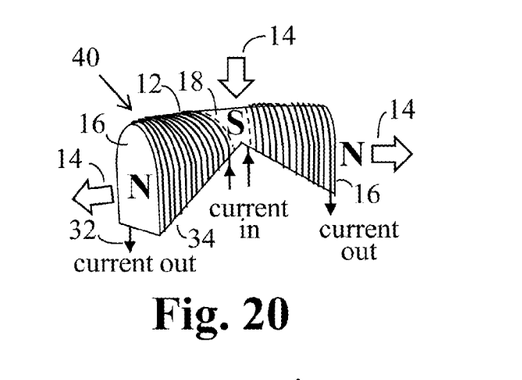
FIG. 20 shows an isometric view of a fourth-embodiment EFDM 40, an electromagnet with a south magnetic pole-area 18 in the center that is smaller than the sum of two north magnetic pole-areas 16 at opposite ends of magnetic material 12.

Fourth-embodiment EFDM 40 is illustrated in FIGS. 17, 18, and 20 (isometric views) and FIG. 19 (side view). Magnetic material 12 is magnetized only when electric current 32 is passed through electric wire 34 surrounding magnetic material 12, such that magnetic material 12 is an electromagnet. Some examples of magnetic materials 12 that work as electromagnets are iron, nickel, cobalt, some alloys of rare-earth metals, and lodestone. Magnet material 12 has one or more north magnetic pole-areas 16 where magnetic field 14 leaves magnetic material 12 and one or more south magnetic pole-areas 18 where magnetic field 14 enters magnetic material 12. According to the well-known right-had rule, the direction of current 32 in electric wire 34 determines which end of material 12 will be a north magnetic pole area 16 and which end will be a south magnetic pole area 18. In this embodiment, the sum of one or more south magnetic pole-areas 18 is smaller than the sum of one or more north magnetic pole-areas 16.

In FIG. 17, south magnetic pole-area 18 is smaller than north magnetic pole-area 16 such that the magnetic flux-density at south magnetic pole-area 18 is greater than the magnetic flux-density at north magnetic pole-area 16. Furthermore, the magnetic flux-density at south magnetic pole-area 18 is greater that if south magnetic pole-area 18 and north magnetic pole-area 16 were equal.

In FIG. 18, two fourth-embodiments EFDMs 40 are positioned such that their smaller south magnetic pole-areas 18 are substantially touching and larger north magnetic pole-areas 16 are at opposite ends of contiguous surface 19. FIG. 19 shows magnetic field 14 entering magnetic material 12 through the smaller south magnetic pole-area 18 substantially parallel to contiguous surface 19 and bending to exit the larger north magnetic pole-areas 16. Magnetic field 14 bends because it follows the path of microstructure alignment of magnetic material 12 when electric current 32 passes through electric wire 34. That path is determined by the arrangement of electric wire 34, and in this embodiment, electric wire 34 is arranged such that magnetic field 14 bends towards north magnetic pole areas 16.

In FIG. 20, magnetic field 14 enters into magnetic material 12 passing through the smaller south magnetic pole-area 18 at the center of magnetic material 12, and magnetic field 14 exits magnetic material 12 passing through the two larger north magnetic pole-areas 16 at opposite ends of magnetic material 12.

Figure 21:
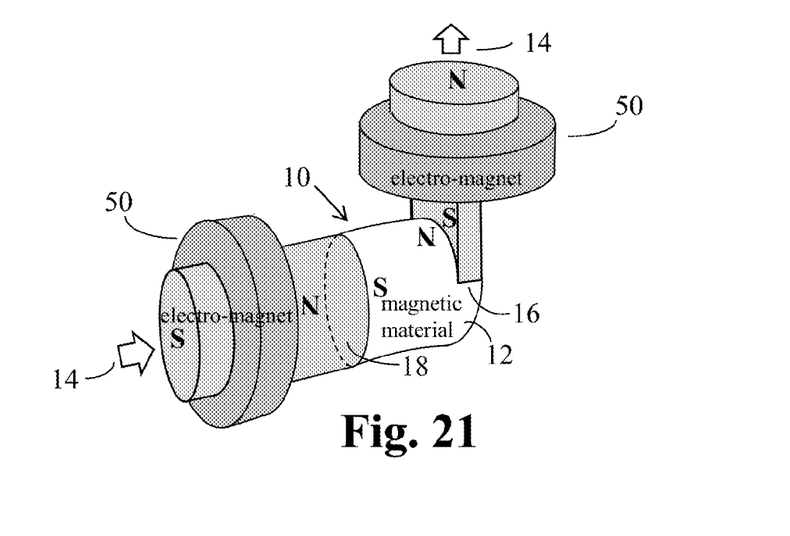
FIG. 21 shows two electromagnets 50 magnetizing a first-embodiment EFDM 10 with a north magnetic pole-area 16 smaller than south magnetic pole-area 18.
Figure 22:
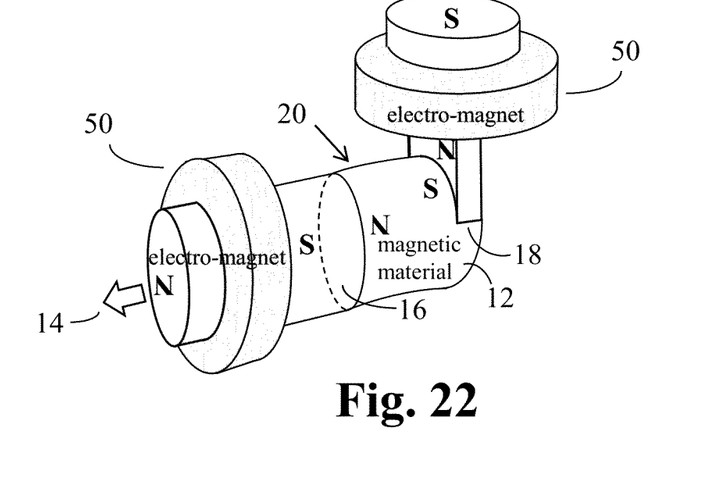
FIG. 22 shows two electromagnets 50 magnetizing a second-embodiment EFDM 20 with a south magnetic pole-area 18 smaller than north magnetic pole-area 16.

Magnetizing An Efdm—FIGS. 21 and 22

A common method of magnetizing said magnetic material 12 into a permanent magnet is using electromagnets 50 to inject a magnetic field 14 into magnetic material 12, aligning the internal microstructure such that magnetic material 12 remains magnetized.

FIG. 21 shows an example of this manufacturing method. The north polarity of one electromagnet 50 is substantially touching the larger, future south magnetic pole-area 18 of a first-embodiment EFDM 10, and the south polarity of a second electromagnet 50 is substantially touching smaller, future north magnetic pole-area 16 of first-embodiment EFDM 10. When electric current 32 is applied to electromagnets 50, a magnetic field 14 is produced through magnetic material 12, aligning the microstructure of magnetic material 12 to the same orientation as magnetic field 14 passing through magnetic material 12. When electromagnets 50 are removed, magnetic material 12 remains magnetized, and its magnetic field 14 follows the same path as magnetic field 14 of electromagnets 50.

FIG. 22 shows how the same magnetic material 12 in FIG. 21 can be made into a second-embodiment EFDM 20. Electromagnets 50 are turned around such that their magnetic field 14 enters the smaller, future south magnetic pole-area 18 and exits the larger, future north magnetic pole-area 16 of magnetic material 12. When electromagnets 50 are removed, magnetic material 12 remains magnetized, and its magnetic field 14 follows the same path as magnetic field 14 of electromagnets 50.

Operation in Motors and Generators—FIGS. 23 through 26

One of the many applications for this new technology will be in motors and generators. FIGS. 23 through 26 illustrate a few of a plurality of motor and generator arrangements where first-embodiment EFDMs 10 and second-embodiment EFDMs 20 are attached to a hub 62 and wire coils 64 are attached to support 66. Hub 62 can rotate relative to a fixed support 66, or support 66 can rotate relative to a fixed hub 62. Furthermore, a plurality of other motor or generator arrangements (not shown) could have wire coils 64 attached to hub 62 and first-embodiment EFDMs 10 and second-embodiment EFDMs 20 attached to support 66 where hub 62 rotates relative to a fixed support 66 or support 66 rotates relative to a fixed hub 62. Furthermore, first-embodiment EFDMs 10 and second-embodiment EFDMs 20 in FIGS. 23 through 26 could be replaced with third-embodiment EFDMs 30 and fourth-embodiment EFDMs 40 electromagnets (not shown).

Magnetic flux 14 produced by each adjacent pair of first-embodiment EFDMs 10 and second-embodiment EFDMs 20, exits north pole-area 16 of first-embodiment EFDM 10, passes through wire coils 64, enters south pole-area 18 of second-embodiment EFDM 20, passes through second-embodiment EFDM 20 and through first-embodiment EFDM 10 to continuously repeat this circular path of magnetic flux 14. Because the outer-diameter pole areas are smaller than the internal pole-areas, their magnetic flux density is greater than if the outer and inner pole-areas were equal. Since the greater magnetic flux density of the outer-diameter poles is what enters wire coils 64, those coils can be smaller without reducing motor or generator power. This feature of reduced wire coil 64 without reducing power is consistent in all four motor/generator configurations shown in FIGS. 23 through 26.

In a motor, an electric current 32 in wire coil 64 creates a magnetic field that repels or attracts first-embodiment EFDMs 10 and second-embodiment EFDMs 20 converting electricity into mechanical power. In a generator, relative motion of first-embodiment EFDMs 10 and second-embodiment EFDMs 20 and wire coils 64 converts mechanical motion into electrical power.

Figure 23:
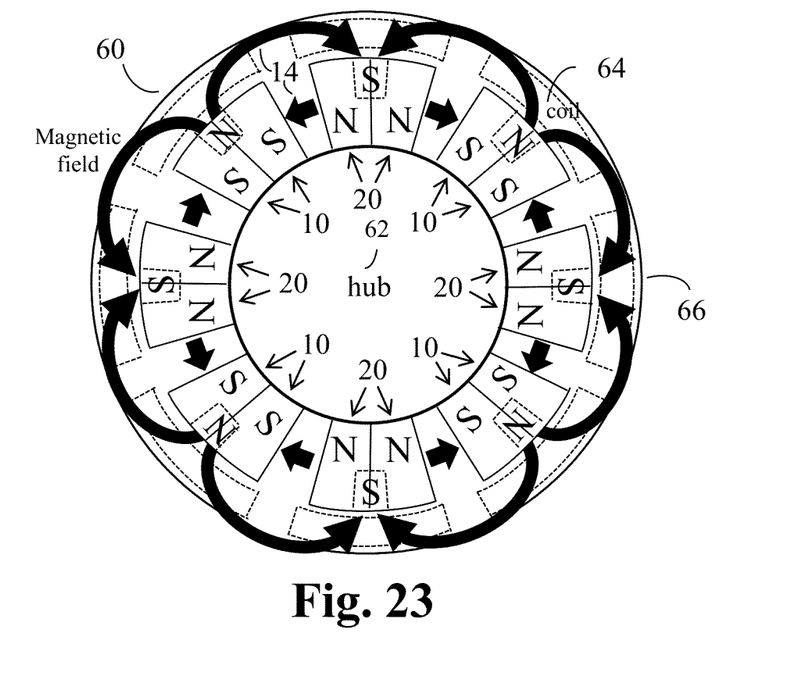
FIG. 23 shows a side-view of an electrical motor or generator 60 with eight, first-embodiment EFDMs 10 and eight, second-embodiment EFDMs 20.

FIG. 23 shows a side-view of an electrical motor or generator 60 with eight, first-embodiments EFDMs 10 and eight, second-embodiments EFDMs 20 attached to hub 62 and surrounded by wire coils 64 attached to support 66.

Figure 24:
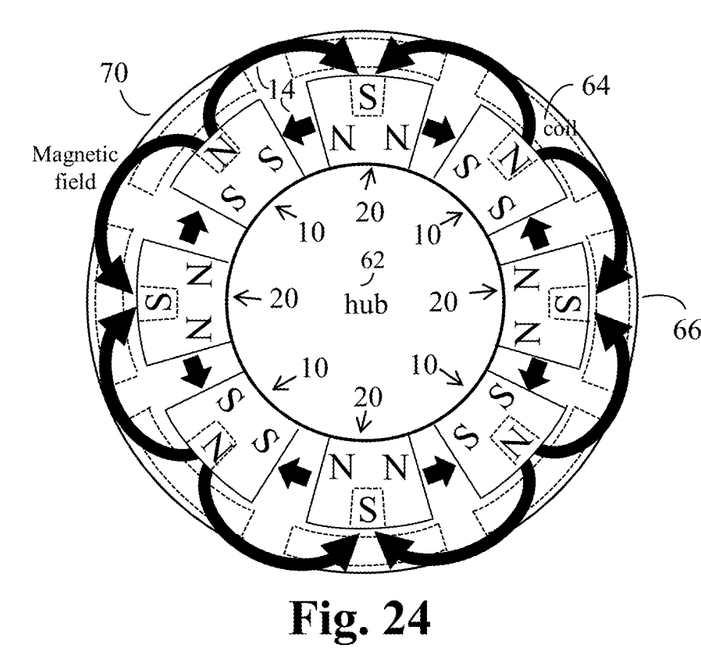
FIG. 24 shows a side-view of an electrical motor or generator 70 with four, first-embodiment EFDMs 10 and four, second-embodiment EFDMs 20.

FIG. 24 shows a side-view of an electrical motor or generator 70 with four, first-embodiment EFDMs 10 and four, second-embodiment EFDMs 20 attached to hub 62 and surrounded by wire coils 64 attached to support 66.

Figure 25:
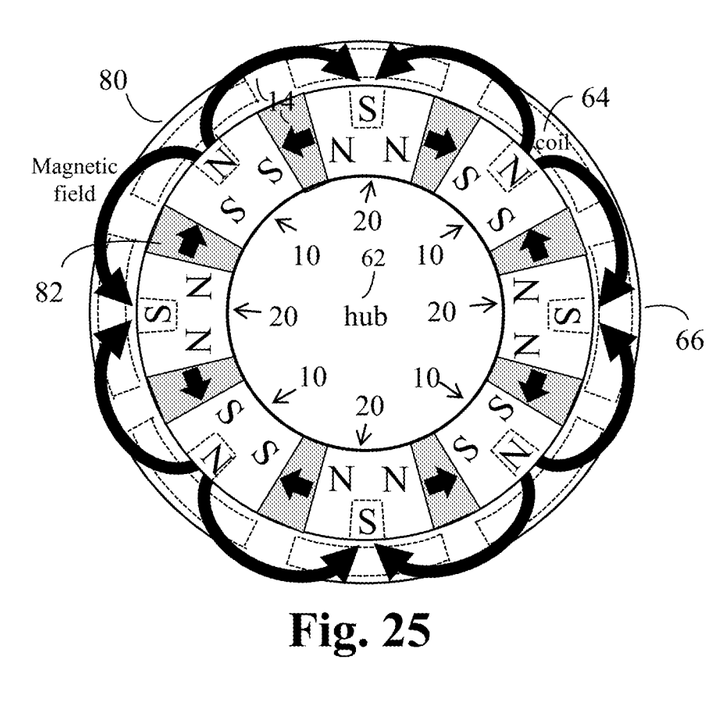
FIG. 25 shows a side-view of an electrical motor or generator 80 with four, first-embodiment EFDMs 10 and four, second-embodiment EFDMs 20 separated by magnetic-iron spacers 82.

FIG. 25 shows a side-view of an electrical motor or generator 80 with four, first-embodiment EFDMs 10 and four, second-embodiment EFDMs 20 attached to hub 62 and surrounded by wire coils 64 attached to support 66. Magnetic iron spacers 82 fill the space between first-embodiment EFDMs 10 and second embodiment EFDMs 20 to assist transfer of magnetic flux 14.

Figure 26:
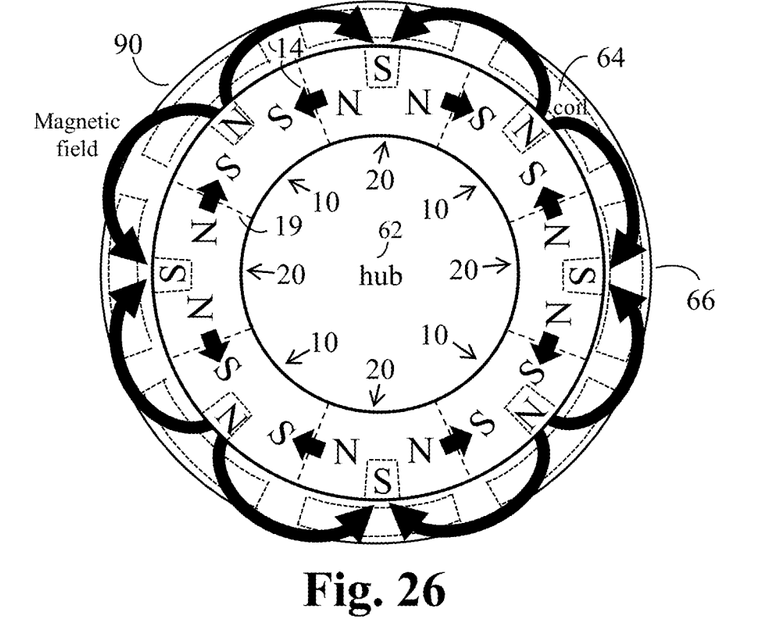
FIG. 26 shows a side-view of an electrical motor or generator 90 with four, first-embodiment EFDMs 10 contiguous with four, second-embodiment EFDMs 20.

FIG. 26 shows a side-view of an electrical motor or generator 90 with four, first-embodiment EFDMs 10 contiguous with four, second-embodiment EFDMs 20 attached to hub 62 and surrounded by wire coils 64 attached to support 66. Contiguous surface 19 can be a real division of adjacent first-embodiment EFDM 10 and second-embodiment EFDM 20 such that magnetic material 12 is segmented, or contiguous surface 19 can be an imaginary division of adjacent first-embodiment EFDM 10 and second-embodiment EFDM 20 such that magnetic material 12 is a solid ring.

Advantages

From the description above, a number of advantages of some of my embodiments of my enhanced flux-density magnet become evident:

(a) The greater magnetic flux-density of the EFDM enables less coil wire without reducing power from an electrical motor or generator. Less wire reduces cost, weight, and volume of the device. This reduction in coil wire is possible because the greater magnetic flux density of the EFDM enables a smaller surface area for the magnetic field to pass through while producing the same power. Ina motor or generator, the smaller magnetic pole-area of the EFDM can be arranged to face the coil wire such that the wire volume can be reduced while not changing the power output of the electric motor or generator. In other words, the magnitude of magnetic flux entering the coil is the same even though the amount of wire is less because the magnetic flux density is proportionally greater, (b) Reducing wire decreases the electrical resistance of the device. Since efficiency is the ratio of load resistance divided by the sum of load resistance and device resistance, significantly reducing the device resistance greatly improves efficiency.

(c) Reducing wire also decreases heat in an electrical device and excess heat is most often what limits the output power of motors and generators. The largest contributor of device heat is electrical resistance in the wire cods. If there is less wire, then there is less heat, and the electrical device can achieve more power before overheating.

(d) The ability of EFDMs to efficiently bend the magnetic field enables an ideal match to the contour of a Folded Electromagnetic Coil (U.S. Pat. No. 8,847,846) such that the average angle of deviation between the magnetic field and the coil-surface normal is near zero, further increasing the magnetic flux-density in the wire coils which enables even less wire without reducing power from an electric motor or generator.

(e) Since the EFDM bends the magnetic field directly normal into the Folded Electromagnetic Cods, magnetic iron can be eliminated because the magnetic field does not need to be transferred; it is already where it needs to be—in the coil. Eliminating magnetic iron reduces weight, cost, volume, and complexity of the device while removing power losses such as iron-core saturation and eddy currents.

(f) Without the weight of magnetic iron, direct-drive wind turbines will become a more practical choice over geared wind turbines. By eliminating the costly and high maintenance gearboxes, the cost of wind energy will be significantly lower. With wind power costing less, it will replace fossil fuel power sources more often, resulting in less green house gases and pollutants that damage our environment.

(g) Since there is no magnetic iron for the magnets to attract, cogging is eliminated. Consequently, motors and generators with EFDMs and ironless wire coils such as Folded Electromagnetic Coils do not lose power to reduce cogging as necessary in many electric devices using magnetic iron. Also, the instability, noise, and damage associated with cogging are avoided.

(h) Some embodiments of the EFDM are ideally suited for magnetically levitating locomotives and other levitated vehicles since the magnetic field is channeled in one direction that is substantially perpendicular to a linear arrangement of magnets.

(i) With EFDM reducing cost, weight, volume, complexity, device resistance, and operating losses, motors and generators can service mankind better and more efficiently while reducing global warming.

Conclusions, Ramifications, and Scope

Accordingly, the reader will see that the enhanced flux-density magnet in its various embodiments uses unequal magnetic pole-areas to enable a greater flux-density than would be possible if the magnetic pole-areas were equal. Furthermore, the magnetic pole-areas can be arranged at various angles relative to each other such that EFDMs can be efficient used in electric motors and generators. For example, EFDMs are arranged such that the smaller magnetic pole-areas with greater magnetic flux-density are positioned close to the wire coils of a motor or generator while the larger magnetic pole-areas with less magnetic flux-density are used to transfer magnetic field from one EFDM to another EFDM. This arrangement of EFDMs provides greater magnetic flux-density at the wire coils which enables less wire to produce the same electromotive force (power). Less wire reduces cost, weight, and volume of the device. Furthermore, the EFDM has the additional advantages in that:

(a) it reduces the electrical resistance of the device. Since efficiency is a ratio of load resistance divided by the sum of load resistance and device resistance, significantly reducing the device resistance greatly improves efficiency. More efficient motors need less electrical input, more efficient generators produce more power, and these benefits on a global scale could greatly reduce world energy consumption.

(b) it lowers the heat generated in the device which most often is what limits the output power of electric motors and generators. If there is less wire then there is less heat, and the device can achieve more power before overheating.

(c) it provides a smaller average-deviation angle between the magnetic flux and the coil-surface normal such that almost all the magnetic flux is effective in the coil, further enabling less wire without reducing power from an electric motor or generator.

(d) it bends the magnetic flux to match the contour of a Folded Electromagnetic Coils such that the average-deviation angle between the magnetic flux and the coil-surface normal are nearly zero, and almost all the magnetic flux is effective in the coil, further enabling less wire without reducing power from an electric motor or generator.

(e) it bends the magnetic flux such that magnetic iron is not necessary to transfer the flux because it is already where it needs to be—in the coil. Eliminating magnetic iron reduces weight, cost, volume, and complexity of the device while removing power losses such as iron-core saturation and eddy currents.

(f) it significantly reduces weight of motors and generators because it eliminates magnetic iron which often is half the device weight. With less generator weight, gearless, direct-drive wind turbines become more practical. Eliminating gears lowers the price of clean wind energy, making it a more likely choice over dirty fuels that pollute the environment and cause global warming.

(g) it eliminates cogging which is a drag force between magnets and magnetic iron. When EFDMs are paired with ironless wire coils such as Folded Electromagnetic Coils, there is no magnetic iron for the magnets to attract and cogging is eliminated. Consequently, motors and generators with EFDMs and ironless wire coils do not lose power to reduce cogging as is necessary in many electric devices using magnetic iron. Also, the instability, noise, and damage associated with cogging are avoided.

(h) it bends magnetic flux such that the magnetic flux can exit and enter on only one side of an array of EFDMs. This can be useful for magnetically levitating locomotives above only one side of a long line of magnets.

Although the description above contains many specificities, these should not be construed as limiting the scope of the embodiment but as merely providing illustrations of some of several embodiments. For example, the EFDM can have other shapes, such as square, rectangular, circular, oval, trapezoidal, triangular, etc.; the bending of the magnetic field inside the magnetic material can have other shapes such as straight, bowed, perpendicular, parallel, sinusoidal, etc.; the magnetic pole-areas can be positioned at various angles relative to each other; the magnetic pole-areas can have any shape such as square, rectangular, circular, oval, trapezoidal, triangular, etc.; the area of the poles can vary greatly or vary just by a few percent, and the magnetic pole areas of a given polarity do not have to be the same size.

Thus, the scope of the embodiment should be determined by the appended claims and their legal equivalents, rather than by examples given.

I claim:

1. An electrical motor or generator, comprising:
   a) a plurality of magnets, wherein,
      i. a sum of magnetic pole-areas of a first pole is smaller than the sum of magnetic pole-areas of a second pole, and
      ii. a density of a magnetic field of the first pole is greater than a density of the magnetic field of the second pole;
   b) one or more coils of wire;
   c) a coil support structure; and
   d) a magnet support structure wherein the first pole of the plurality of magnets are near contiguous with one of the one or more coils of wire, wherein, the one or more coils of wire and the plurality of magnets can move relative to each other with the magnetic field from the first pole of the plurality of magnets passing through the one or more coils of wire.

2. The electrical motor or generator according to claim 1, wherein, the plurality of magnets are permanent magnets.

3. The electrical motor or generator according to claim 1, wherein, the plurality of magnets are electromagnets.

4. The electrical motor or generator according to claim 1, wherein, magnetic field bends inside the plurality of magnets.

5. The electrical motor or generator according to claim 1, wherein, the magnet support structure is substantially circular and substantially concentric with the coil support structure.

6. A method of reducing a coil of wire in an electrical motor or generator without reducing power of the electrical motor or generator, the method comprising:
   a. installing a plurality of magnets in the electrical motor or generator, wherein,
      i. a sum of magnetic pole-areas of a first pole is smaller than the sum of magnetic pole-areas of a second pole, and
      ii. a density of a magnetic field of the first pole is greater than a density of the magnetic field of the second pole;
   b. installing one or more coils of wire in the electrical motor or generator;
   c. installing a coil support structure in the electrical motor or generator; and
   d. installing a magnet support structure in the electrical motor or generator wherein the first pole of the plurality of magnets are near contiguous with one or more coils of wire; wherein, the one or more coils of wire and the plurality of magnets can move relative to each other with the magnetic field from the first pole of the plurality of magnets passing through the one or more coils of wire.

7. The method according to claim 6, wherein, the one or more magnets are permanent magnets.

8. The method according to claim 6, wherein, the one or more magnets are electromagnets.

9. The method according to claim 6, wherein, magnetic field bends inside the one or more magnets.

10. The method according to claim 6, wherein, the magnet support structure is substantially circular and concentric with the coil support structure.

11. An electrical motor or generator, comprising:
a) a plurality of magnets, wherein,
   i. one or more type 1 magnets, wherein, a density of a magnetic field exiting north magnetic pole-areas is higher than a density of a magnetic field entering a south magnetic pole-areas because a sum of the north magnetic pole-areas is smaller than a sum of the south magnetic pole-areas,
   ii. one or more type 2 magnets, wherein, the density of the magnetic field entering the south magnetic pole-areas is higher than the density of the magnetic field exiting the north magnetic pole-areas because the sum of the south magnetic pole-areas is smaller than the sum of the north magnetic pole-areas;
b) one or more coils of wire;
c) a coil support structure; and
d) a magnet support structure where the north magnetic pole-areas of the one or more type 1 magnets and the south magnetic pole-areas of the one or more type 2 magnets are near contiguous with the one or more coils of wire such that the magnetic field passes through the one or more coils of wire when the coil support structure moves relative to the magnet support structure.

12. The electrical motor or generator according to claim 1, wherein, the one or more type 1 magnets and one or more type 2 magnets are permanent magnets.

13. The electrical motor or generator according to claim 1, wherein, the one or more type 1 magnets and one or more type 2 magnets are electromagnets.

14. The electrical motor or generator according to claim 1, wherein, magnetic field bends inside the sum of the one or more type 1 magnets and one or more type 2 magnets.

15. The electrical motor or generator according to claim 1, wherein, the magnet support structure is substantially circular and concentric with the coil support structure.

* * * * *